Aug. 28, 1951
L. D. ELLS ET AL
2,566,060
ELECTRIC OUTLET BOX CONNECTOR
Filed June 3, 1949
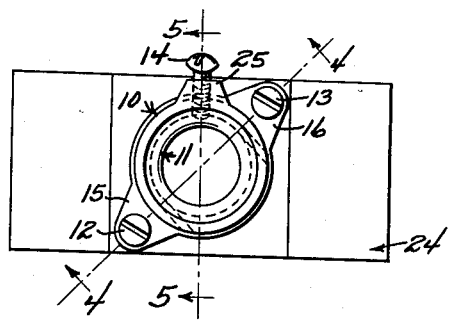
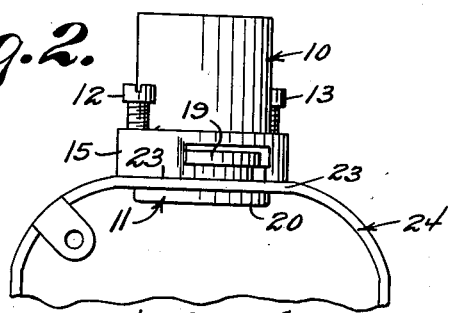
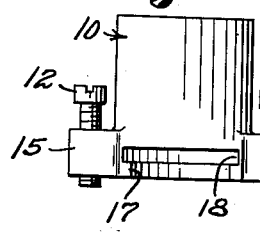
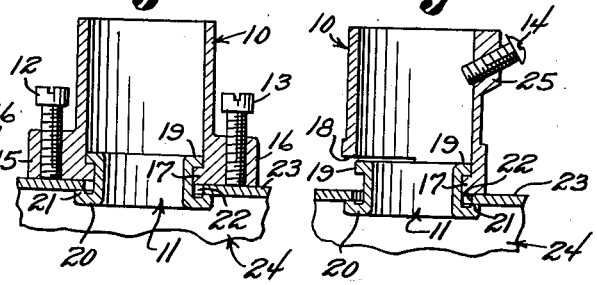
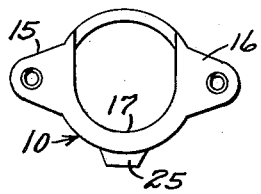
INVENTORS
Lee D. McJilton
Leslie D. Ells
BY Victor J. Evans & Co.
ATTORNEYS Patented Aug. 28, 1951

2,566,060

UNITED STATES PATENT OFFICE 2,566,060

ELECTRIC OUTLET BOX CONNECTOR

Leslie D. Ells and Lee D. McJilton,
Los Angeles, Calif.

Application June 3, 1949, Serial No. 96,964

3 Claims. (Cl. 285—6.5)

1

This invention relates to connections between conduits for holding electric wiring and switch or outlet boxes, and in particular the invention relates to a connector with which the end of a conduit may readily be connected to an opening in the side of a switch or outlet box.

The purpose of this invention is to provide a connector with which the end of a conduit may be attached to a switch or outlet box in the least possible time.

Various methods have been used for connecting conduits to switch outlet boxes of this type but with the most simple type of connection considerable time is lost.

The object of this invention is, therefore, to provide an improved connector that may readily be inserted through the opening of the switch or outlet box and clamped in position with the end of a conduit therein by a screw driver.

Another object of the invention is to provide a connector for attaching conduits to switch and outlet boxes which includes a minimum number of parts.

A further object of the invention is to provide a connector for holding the ends of electric conduits to switch and outlet boxes which is of a simple and economical construction.

With these and other objects and advantages in view the improved connector of this invention includes a small sleeve or collar having a flange at each end and a connector having a side slot to receive one end of the collar with clamping screws for securing the connector and collar in clamping relation with the sides of a switch or outlet box, and a set screw for securing the end of a conduit in the connector.

Other features and advantages of the invention will appear from the following description taken in connection with the drawings wherein:

Figure 1 is a side elevational view looking toward one side of an outlet box showing the connector in position thereon.

Figure 2 is a plan illustrating the connector on one side of an outlet box with part of the box broken away.

Figure 3 is a side elevational view of the connector.

Figure 4 is a longitudinal section through the connector and collar with parts of the side of an outlet box shown therein and taken on line 4—4 of Figure 1.

Figure 5 is a similar section taken on line 5—5 of Figure 1.

Figure 6 is an end view showing the inner end of the connector and illustrating the position of the side outlet or socket through which the collar is inserted in the connector.

Referring now to the drawings wherein like reference characters denote corresponding parts the switch or outlet box connector of this invention includes a sleeve 10, a flanged collar 11, clamping screws 12 and 13 and a set screw 14.

The sleeve 10 which forms the body of the connector is formed with lugs 15 and 16 extending from the base and in which the clamping screws 12 and 13 are threaded and at the inner end of the cylindrical opening or bore is a flange 17, the inside diameter of which is slightly larger than the outside diameter of the intermediate part of the collar 11, as illustrated in Figure 4. One side of the connector is provided with an outlet or socket 18 through which the inner flange 19 of the collar 11 passes as the collar is inserted in the connector with the flange 17 behind or under the flange 19.

The opposite end of the collar 11 is provided with a slightly larger flange 20 having a rim or bead 21 on the inner surface and, as illustrated in Figures 4 and 5 the outer end of the collar 11 on which the flange 19 is positioned is pushed through an opening 22 in a wall 23 of an outlet box 24 and then the connector is slid over the flange 19 on the outer end of the collar by inserting the flange in the socket 18 and when the parts are in position clamp screws 12 and 13 are tightened to place tension on the collar and thereby clamp the connector in position on the outlet box.

An end of a conduit is inserted in the sleeve portion of the connector 10 and the conduit is secured in the connector by the set screw 14 which is threaded in a boss 25 on the outer end of the connector.

With the parts arranged in this manner the collar 11 is positioned in an opening of a switch or outlet box by inserting the outer end with the flange 19 thereon in the opening and then sliding the connector 10 by means of the socket 18 over the flange 19 on the outer end of the collar, and the parts are rigidly secured in this position by the clamp screws 12 and 13. The connector may be readily removed from the outlet box by loosening the screws 12 and 13 and the conduit may be removed from the connector by loosening the set screw 14.

It will be understood that modifications may be made in the design and arrangement of the parts without departing from the spirit of the invention.

What is claimed is:

1. An outlet box connector comprising a collar having a flange on each end, with the diameter of the flange on one end less than that of the flange on the other end whereby the flange on one end of the collar passes through an opening in an outlet box with the flange on the opposite end retaining the collar in a wall of the box in which the said opening is positioned, a sleeve having a base with a socket opening through one side thereof and having laterally disposed lugs thereon, said socket in the base of the sleeve positioned to receive a flange of the collar, screws threaded in the lugs of the base for clamping the base of the sleeve against a side of an outlet box with the collar in an opening in said side, and a set screw for securing a conduit in said sleeve.

2. In an outlet box connector, the combination which comprises an outlet box having side walls with circular openings therethrough, a collar having a flange on the outer end the diameter of which is less than the diameter of the opening in the wall of the outlet box and a flange on the inner end the diameter of which is greater than that of the opening through the wall of the outlet box whereby the collar is inserted through an opening in a side wall of an outlet box with the flange on one end passing through the opening and the flange on the opposite end retaining the collar in the opening, and a conduit holding socket having a side opening for receiving the flange on the outer end of the collar and having clamping means therein for clamping the socket against the outer surface of the outlet box with the flange on the inner end of the collar against the inner surface of the wall of the outlet box.

3. In an outlet box connector, the combination which comprises an outlet box having side walls with circular openings therethrough, a collar having a flange on the outer end the diameter of which is less than the diameter of the opening in the wall of the outlet box and a flange on the inner end the diameter of which is greater than that of the opening through the wall of the outlet box, a connector having a socket for receiving a conduit in the outer end with lugs extended from the inner end and with a socket having a side outlet for receiving the flange on the outer end of the collar in the inner end, set screws threaded in the lugs of the connector for clamping the connector to the wall of the outlet box with the flange on the inner end of the collar against the inner surface of the wall, and a set screw for securing the end of a conduit in the socket in the outer end of the connector.

LESLIE D. ELLS.
LEE D. McJILTON.

REFERENCES CITED

The following references are of record in the file of this patent:

UNITED STATES PATENTS

| Number | Name | Date |
|--------|------|------|
| 936,886 | Hannold | Oct. 12, 1909 |